Jan. 7, 1941.  A. PFAU  2,228,153

CONTROL SYSTEM FOR PRIME MOVERS

Filed March 7, 1940  2 Sheets-Sheet 1

Jan. 7, 1941.　　　　A. PFAU　　　　2,228,153

CONTROL SYSTEM FOR PRIME MOVERS

Filed March 7, 1940　　　2 Sheets-Sheet 2

Inventor
A. Pfau
by
Attorney

UNITED STATES PATENT OFFICE 2,228,153

CONTROL SYSTEM FOR PRIME MOVERS

Arnold Pfau, Milwaukee, Wis., assignor to Allis-Chalmers Manufacturing Company, Milwaukee, Wis., a corporation of Delaware Application March 7, 1940, Serial No. 322,659

14 Claims. (Cl. 290—4)

This invention relates to a control system for prime movers and more particularly to control systems for hydro-electric units which may be connected in parallel to feed into a common power transmission line or in which the several units may be required to operate individually for supplying local energy consuming devices.

If a hydro-electric unit operates independently as when the unit is disconnected from a large network and supplies energy for local consumption only, the inertia of the revolving masses of the single prime mover and generator is comparatively small and requires a speed governor comprising a flyball and a relay allowing a large speed droop from no load speed to full load speed, so that the speed responsive flyballs of the governor do not overtravel the predetermined limits and cause "hunting" of the unit. The speed droop of a prime mover is generally defined as the difference in speed between its steady speed at no load and its steady speed at full load. If the hydro-electric unit is connected in parallel with a large network, the inertia of the rotating masses of the entire system is available and is so great that the speed changes and the load changes are a relatively small percentage of the total load and are very gradual, thereby practically eliminating the danger of overtravel of the flyball. It is then essential that the speed droop allowed by the governor be made as small as possible so as to pick up or throw off substantial loads even under slight speed changes in the system. Heretofore changes in speed droop were obtained by change in the setting of an oil filled dashpot interposed in the relaying leverages of a speed governor. The action of such dashpot is, however, affected by temperature and other variables and does not permit instantaneous or automatic change in speed droop as is the case with the present construction which thus displaces such dashpots.

It is therefore an object of the present invention to provide a control system for prime mover units with means for positively varying the speed droop allowed by the governor when the unit is either connected in parallel with a large network or is connected with a network for local or small consumption only.

Another object of this invention is to provide a control system for prime mover units with solenoid operated means for permitting different speed droops by the governor when the unit is either supplying energy to a large network or when it operates independently, or as a standby unit.

Another object of this invention is to provide a control system for prime mover units with an automatically controlled solenoid operated means for allowing different speed droops dependent on the inertia of the rotating masses connected with the power output line.

Objects and advantages other than those above set forth will be apparent from the following description when read in connection with the accompanying drawings, in which.

Figure 1:
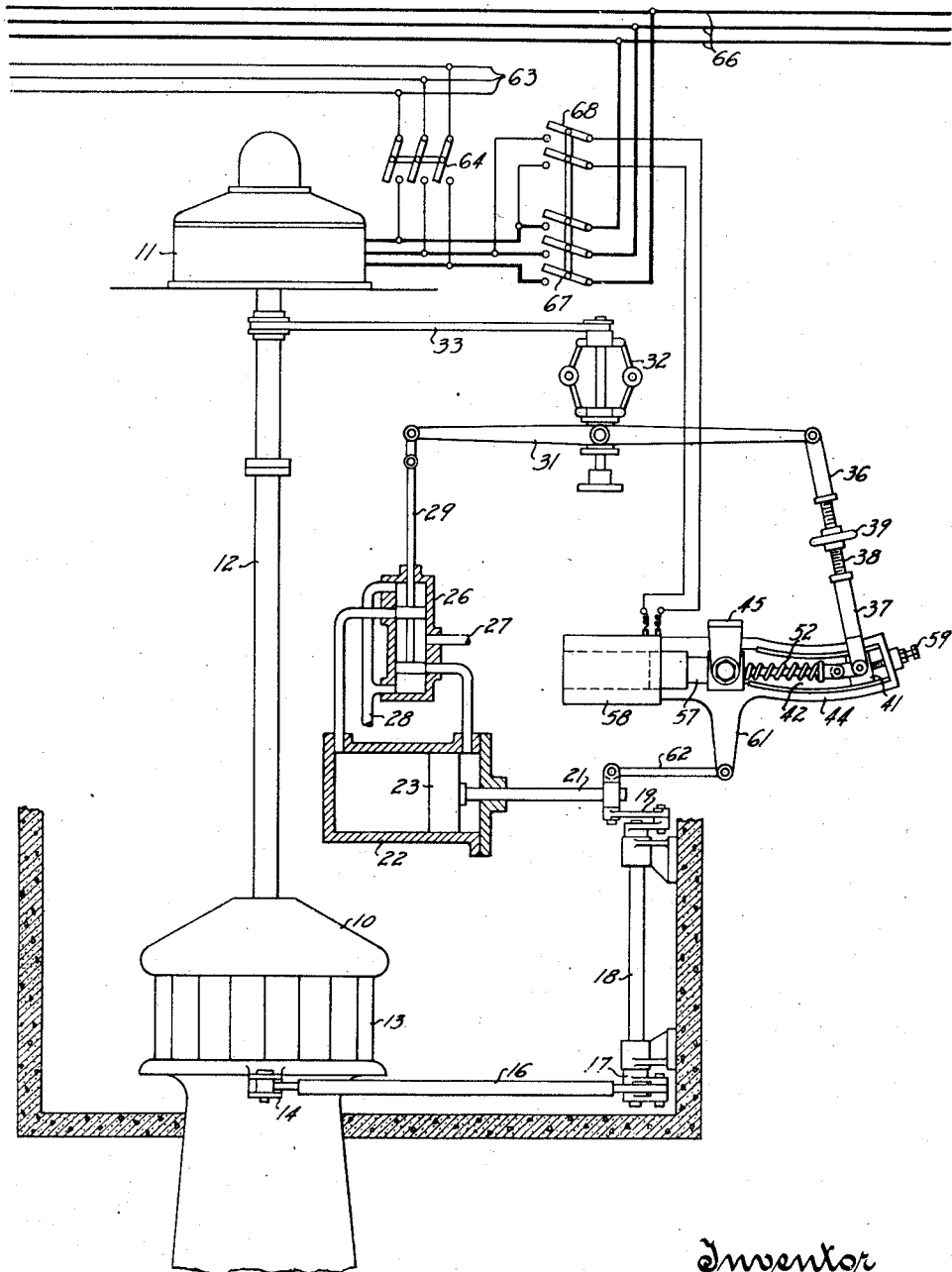
Fig. 1 is a diagrammatic illustration of a hydro-electric unit embodying one form of the improved control system of the present invention.
Figure 2:
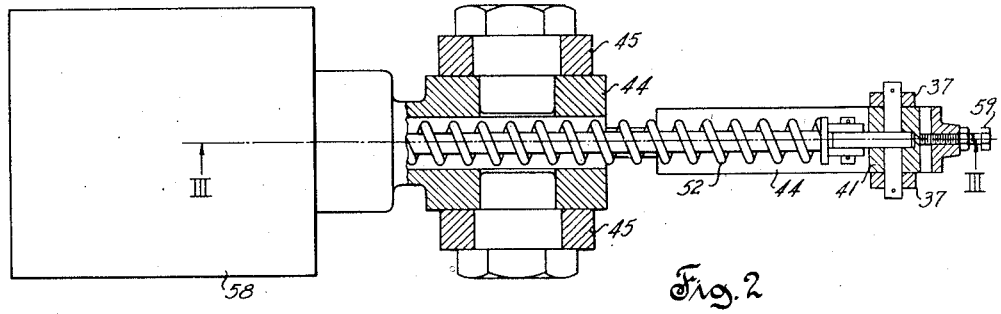
Fig. 2 is a partial sectional view, taken on the line II—II of Fig. 3, of the relay leverage together with the solenoid operated mechanism for varying the stroke of the relay rod.
Figure 3:
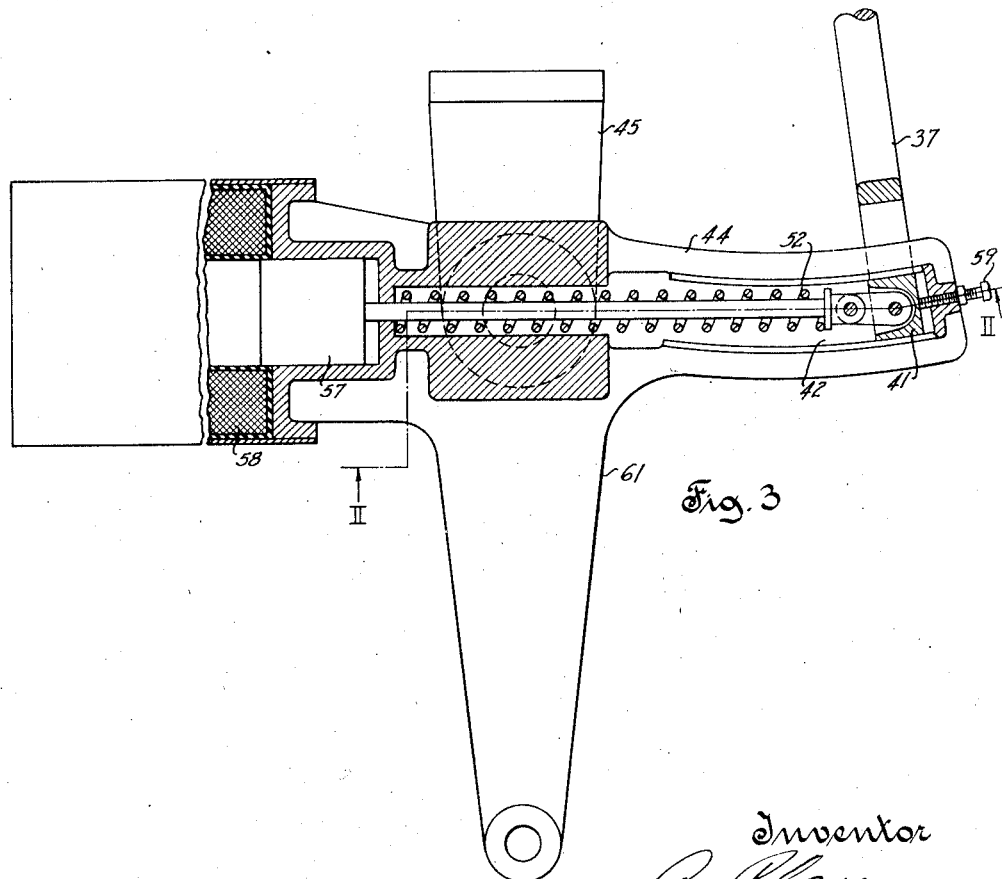
Fig. 3 is a vertical section of the relay leverage taken on the line III—III of Fig. 2.

Referring more particularly to the drawings by characters of reference, the improved control system herein disclosed is shown as applied to a prime mover such as a hydraulic turbine 10 driving a generator 11 through a sectionalized shaft 12. The admission of fluid pressure for actuating the turbine is controlled by a gate shown as an annuar series of gate vanes 13 adapted to be moved into different positions by a shifting ring 14. The shifting ring is moved through a connecting rod 16 and a crank arm 17 secured to a gate operating shaft 18 which is in turn connected through a crank 19 with a piston rod 21 of a servomotor comprising a cylinder 22 and a piston 23. The servomotor piston 23 is actuated by fluid pressure controlled by the control or pilot valve 26 to which the fluid pressure is supplied from a source not shown through a pipe 27, and the pilot valve directs the fluid pressure to either side of the operating servomotor piston 23, thereby actuating the gate 13 of the turbine. Fluid is discharged from the two ends of the servomotor cylinder 22 through a drain pipe 28 to a sump not shown. The stem 29 of the pilot valve 26 is pivotally connected to one end of a floating lever 31 which is actuated by a flyball 32 driven from the main shaft 12 by a belt 33.

The other end of the floating lever 31 is pivotally connected to a telescopic relay rod which comprises two threaded tubular portions 36 and 37 cooperating with a right and left hand threaded spindle 38 engaging the two tubes. Spindle 38 may be rotated by either an electric motor remotely controlled or manually by a hand wheel 39 as shown, for varying the length of the connecting rod 36, 37, when the unit is to be started or synchronized with other units supplying energy to the same transmission line. One end of the connecting rod 36, 37 is provided with a cross-head 41 movable in a slot 42 in a lever 44 mounted on a bracket 45. The cross-head may be shifted in the slot from the outermost leverage point of the slot to the innermost point thereof, thereby changing the relay stroke of the floating lever with reference to the servomotor stroke. The slot 42 may form a portion of a circle with a radius approximately equal to the length of the connecting rod 36, 37, so that, under normal operating conditions, shifting of the cross-head will not vary the elevation of the floating lever 31. The cross-head, together with the connecting rod 36, 37, is biased toward the outermost position by a compression spring 52 within the relay lever and the cross-head is moved toward the innermost position in the slot by the movement of the core 57, upon energization of the coil 58 of a solenoid formed with or associated with the relay lever 44. The stroke of the cross-head may be limited or varied by adjustment of set screw 59 in the end of the slotted lever. The piston rod 21 of the servomotor is connected to an arm 61 of the relay lever 44 by a connecting rod 62 for the purpose of transmitting movement from the servomotor piston to the floating lever to restore the pilot valve to its normal midposition after each succeeding movement thereof which precedes each movement of the servomotor piston 23. Lever 44 and arm 61 are integral and form a bell crank to which rod 36, 37 is connected.

The generating unit 11 may be connected either to a local power output line 63 by means of a switch 64 or to a large transmission system 66 by a switch 67 having auxiliary contacts 68 controlling a circuit to the coil 58 of the solenoid. The hydro-electric unit 10, 11 may therefore be operated either independently to furnish power to a small or local load or in parallel with a plurality of other units to supply a large load which may, of course, be widely distributed. When the switch 64 is either opened or closed, the solenoid 57, 58 is deenergized and the spring 52 moves the cross-head 41 to the right hand end of the slot in bell crank arm 44 and against the set screw 59 in which position the movement of the servomotor piston 23 is relayed to the floating lever 31 with the maximum amplification due to the fact that the maximum length of arm 44 is effective in the leverage from the servomotor piston to the floating level. Movement of the servomotor piston 23 is therefore relayed to the floating lever 31 in such manner as to secure the most rapid possible return of the pilot valve 26 to its midposition. When the switch 67 is closed, its auxiliary contacts 68 are also closed to energize the coil 58 of the solenoid which then draws the cross-head 41 toward the left end of the slot against the action of spring 52. The effective length of the lever arm 44 in the leverage is therefore reduced to the minimum. The effect of movement of the servomotor piston 23 on the leverage is minimized and the end of floating lever 31 is therefore moved by only a relatively small amount even for large strokes of the servomotor piston. The pilot valve 26 is therefore returned to midposition only by small increments for a given servomotor stroke thus eliminating the large movement of the pilot valve and servomotor which is necessary when the unit is operated individually but which is entirely undesired when the unit is a portion of a large system with a relatively high flywheel or $WR^2$ effect.

Assuming now that the pilot valve and servomotor are under fluid pressure, the unit may be started by operation of the hand wheel 39 which rotates the spindle 38 to increase the length of the rod 36, 37. The end of the floating lever 31 will be raised, thereby causing a downward movement of the valve stem 29 and the valve piston connected therewith. Fluid pressure is then admitted to the right-hand side of the servomotor piston 23 and forces the piston toward the left or gate opening position. Fluid displaced by the piston 23 in the left hand end of the servomotor cylinder 22 is discharged through the pilot valve and the discharge pipe 28. Movement of the piston 23 opens the gate 13 to admit operating fluid to the turbine. Due to the absence of a dashpot generally employed in compensating or restoring mechanisms, the restoration or compensation of the control pistons of the pilot valve to the midposition takes place directly and simultaneously with the movement of the servomotor piston. The synchronizer wheel 39 therefore requires several adjustments until the unit is in condition to be connected either to the local network 63 or to the large network 66 by means of the switches 64 or 67, respectively.

If the unit operates independently, that is, if the generator supplies energy only to local network 63 or is operating under no load or friction load only as a standby unit, the inertia of the rotating masses involved is comparatively small. The frequency control of the unit therefore depends primarily upon the stability of the governor which requires a flyball and relay allowing a large speed droop to prevent the flyball from overtraveling, which would cause "hunting" of the unit. It will be seen that the switch 68 is still open and the solenoid 57, 58 is still deenergized. The compression spring 52 is therefore still fully expanded and pushes the cross-head 41 with the end of the connecting rod 36, 37 to the outermost position of the relay lever 44. A large restoring stroke of the end of the floating lever is thus obtained, which compensates for the large speed droop and therefore eliminates "hunting" of the unit.

If the unit is in parallel with other units connected with the large network 66, a switch 67, 68 is closed and the coil 58 of the solenoid is energized. Spring 52 is then compressed and the cross-head 41 is moved forward or toward the innermost or short leverage position of the relay lever. Since the end of the floating lever is centrally located between the two end positions of the cross-head, the pivot must change its elevation. It will be obvious that, if the unit is in parallel with the large network, the inertia of the rotating mass is large, the speed changes are therefore only gradually apparent and are small. A relatively small restoring stroke of the end of the floating lever is thus obtained which exactly compensates for the lower speed droop which the flyballs may now permit. Overtravel of the flyballs and "hunting" of the unit are accordingly prevented.

From the above description it will be seen that the operation of a prime mover generating unit is controlled by a servomotor which may be operated by either fluid pressure or electrically. The servomotor is controlled by means responsive to the speed of the unit and the movements of the servomotor are relayed back to the speed responsive means to cause such movement thereof as will interrupt operation of the servomotor after each movement thereof. Overtravel in regulation and "hunting" of the unit are thus readily prevented. The action desired from the relay leverage, which includes bell crank 44, 61 and rod 36, 37 is varied dependent on whether or not the unit is connected to the output line by the switch having contacts for controlling energization of the solenoid 57, 58. When such solenoid is energized, the cross-head 41 on the end of rod 36, 37 is pulled to the left within the slot in the bell crank arm 44 against the biasing action of the spring 52. Such change in position of the cross-head reduces the effective length of arm 44 without in any way requiring change of the length of rod 36, 37 which length has been previously determined by movement of the wheel 39 to synchronize the unit. The change in effective length of the bell crank arm 44 changes the relaying action of the leverage in transmitting movement of the servomotor back to the speed responsive control means and such change is either to secure frequent small movements or a few larger movements of the servomotor and gate. The speed of the unit is therefore controlled either very closely to a predetermined level with very little speed droop or a comparatively large speed droop is permitted.

Although but one embodiment of the present invention has been illustrated and described, it will be apparent to those skilled in the art that various modifications and changes may be made therein without departing from the spirit of the invention or from the scope of the appended claims.

It is claimed and desired to secure by Letters Patent:

1. In a control system for a prime mover arranged for connection with either of a plurality of different energy consuming means, means for controlling the quantity of energy producing fluid supplied to the prime mover, a speed governor controlling the operation of said fluid control means, and means for varying the droop of said speed governor dependent on the energy consuming means connected with the prime mover.

2. In a control system for a prime mnover arranged for connection with either of a plurality of energy consuming devices having different inertia characteristics, means for controlling the quantity of energy producing fluid supplied to the prime mover, a speed governor controlling the operation of said fluid control means, means for returning said fluid control means to midposition after each operation thereof, and means for varying the droop of said speed governor dependent on the energy consuming device connected with the prime mover.

3. In a control system for a prime mover generating unit arranged for connection with either of a plurality of different power output lines, a gate for controlling the flow of fluid to the prime mover, a servomotor for operating said gate, speed responsive means for controlling the operation of said servomotor, means connecting said speed responsive means with said servomotor for interrupting movement of the same after each operation thereof, and means for varying the action of said interrupting means dependent on the output line connected with the unit.

4. In a control system for a prime mover generating unit arranged for connection with either of a plurality of different power output lines, a gate for controlling the flow of fluid to the prime mover, a servomotor for operating said gate, speed responsive means for controlling the operation of said servomotor, means connecting said speed responsive means with said servomotor for interrupting movement of the same after each operation thereof, and means for varying the action of said interrupting means upon connection of the unit with a predetermined one of the output lines.

5. In a control system for a prime mover generating unit arranged for connection with either of a plurality of different power output lines, a gate for controlling the flow of fluid to the prime mover, a servomotor for operating said gate, speed responsive means for controlling the operation of said servomotor, means connecting said speed responsive means with said servomotor for interrupting movement of the same after each operation thereof, and a solenoid energized upon connection of the unit with one of the output lines and varying the action of said interrupting means.

6. In a control system for a prime mover generating unit arranged for connection with either of a plurality of different power output lines, a gate for controlling the flow of fluid to the prime mover, a servomotor for operating said gate, speed responsive means for controlling the operation of said servomotor, a leverage connecting said speed responsive means with said servomotor for interrupting movement of the same after each operation thereof, and means for varying the action of said leverage dependent on the output line connected with the unit.

7. In a control system for a prime mover generating unit arranged for connection with either of a plurality of different power output lines, a gate for controlling the flow of fluid to the prime mover, a servomotor for operating said gate, speed responsive means for controlling the operation of said servomotor, a bell crank connected with said speed responsive means and with said servomotor for interrupting movement of said servomotor after each operation thereof, and means for varying the effective length of one of the arms of said bell crank dependent on the output line connected with the unit.

8. In a control system for a prime mover generating unit arranged for connection with either of a plurality of different power output lines, a gate for controlling the flow of fluid to the prime mover, a servomotor for operating said gate, speed responsive means for controlling the operation of said servomotor, a bell crank connected with said servomotor, a rod connecting said speed responsive means with one arm of said bell crank, said bell crank and said rod relaying movement of said servomotor to said speed responsive means for interrupting movement of said servomotor after each operation thereof, and means for varying the effect of said bell crank and said rod for varying the action of said speed responsive means dependent on the output line connected with the unit.

9. In a control system for a prime mover generating unit arranged for connection with either of a plurality of different power output lines, a gate for controlling the flow of pressure fluid to the prime mover, a servomotor for operating said gate, speed responsive means for controlling the operation of said servomotor, a bell crank connected with said servomotor, a rod connecting said speed responsive means with one arm of said bell crank, said bell crank and said rod relaying movement of said servomotor to said speed responsive means for interrupting movement of said servomotor after each operation thereof, and a solenoid connected with an end of said rod for varying the connection thereof with said bell crank upon connection of the unit with one of the output lines.

10. In a control system for a prime mover generating unit arranged for connection with either one of a plurality of different power output lines, a gate for controlling the flow of fluid pressure to the prime mover, speed responsive means actuated by the unit, a fluid pressure operated servomotor for operating said gate, a valve actuated by said speed responsive means for controlling the flow of fluid pressure to said servomotor, means connecting said servomotor with said speed responsive means for restoring said valve to midposition after each operation thereof, and means for varying the action of said restoring means dependent on the output line connected with the unit.

11. In a control system for a prime mover generating unit arranged for connection with either one of a plurality of different power output lines, a gate for controlling the flow of fluid pressure to the prime mover, speed responsive means actuated by the unit, a fluid pressure operated servomotor for operating said gate, a valve actuated by said speed responsive means for controlling the flow of fluid pressure to said servomotor, a leverage connecting said speed responsive means with said servomotor for restoring said valve to midposition after each operation thereof, and means for varying the effect of said leverage dependent on the output line connected with the unit.

12. In a control system for a prime mover generating unit arranged for connection with either one of a plurality of different power output lines, a gate for controlling the flow of fluid pressure to the prime mover, speed responsive means actuated by the unit, a fluid pressure operated servomotor for operating said gate, a valve actuated by said speed responsive means for controlling the flow of fluid pressure to said servomotor, a leverage connecting said servomotor with said speed responsive means for restoring said valve to midposition after each operation thereof, and a solenoid for varying the action of said leverage upon the connection of the unit and of said solenoid with one of the output lines.

13. In a control system for a prime mover generating unit arranged for connection with either one of a plurality of different power output lines, a gate for controlling the flow of fluid pressure to the prime mover, speed responsive means actuated by the unit, a fluid pressure operated servomotor for operating said gate, a valve actuated by said speed responsive means for controlling the flow of fluid pressure to said servomotor, a bell crank connected with said speed responsive means and with said servomotor for interrupting the movement of said servomotor after each operation thereof, and means for varying the effective length of one of the arms of said bell crank dependent on the output line connected with the unit.

14. In a control system for a prime mover generating unit arranged for connection with either one of a plurality of different power output lines, a gate for controlling the flow of fluid pressure to the prime mover, speed responsive means actuated by the unit, a fluid pressure operated servomotor for operating said gate, a valve actuated by said speed responsive means for controlling the flow of fluid pressure to said servomotor, a bell crank connected with said servomotor, a rod connecting said speed responsive means with one arm of said bell crank, said bell crank and said rod relaying movement of said servomotor to said speed responsive means for interrupting movement of said servomotor after each operation thereof, and means for varying the effect of said bell crank and said rod dependent on the output line connected with the unit.

ARNOLD PFAU.